Oct. 26, 1965 G. W. GEMBERLING 3,214,504
METHOD FOR MAKING A SWIVEL
Filed Dec. 10, 1962
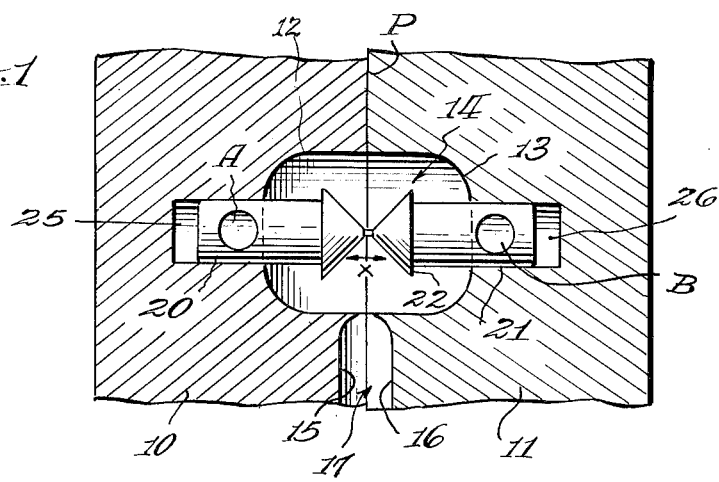
Fig. 1
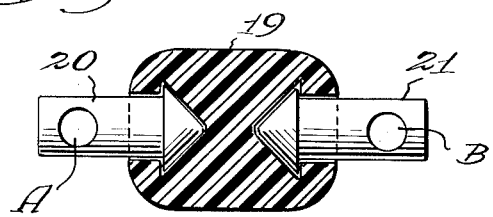
Fig. 2
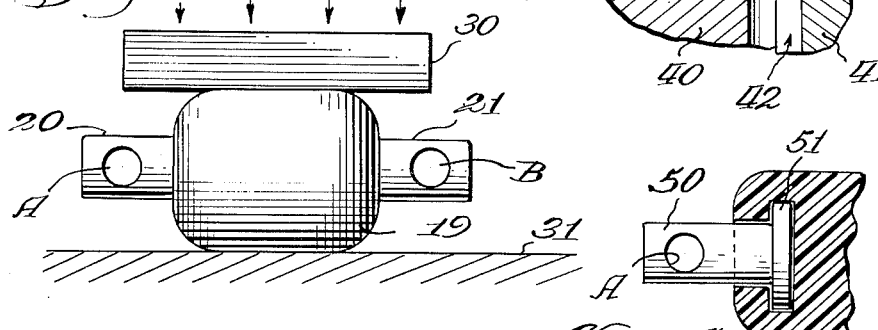
Fig. 3
Fig. 4
Fig. 5
INVENTOR.
George W. Gemberling
BY
John L. Hutchinson
Attorney

United States Patent Office 3,214,504
Patented Oct. 26, 1965

3,214,504
METHOD FOR MAKING A SWIVEL
George W. Gemberling, 1726 N. 18th Ave.,
Melrose Park, Ill.
Filed Dec. 10, 1962, Ser. No. 243,401
4 Claims. (Cl. 264—242)

This invention is concerned with a new and improved method of making a swivel mechanism.

Various swivel mechanisms have been proposed and designed to permit three hundred and sixty degree revolution between connecting elements of the swivel. Many such swivel mechanisms are somewhat complex in design or are relatively expensive. For example, even small swivels frequently used with fishing tackle are comparatively expensive and elaborate in design. Further, many swivel mechanisms are composed of only two elements, whereby binding between or malfunction of the two elements destroys the effectiveness of the swivel.

Accordingly, it is one objective of this invention to provide a method of making a swivel having two rotatable elements, each of which is capable of three hundred and sixty degree rotation completely independent of the other.

Another object is to provide a method of making a swivel of the foregoing type which is simple in design, relatively inexpensive and readily lends itself to mass production methods.

These and other objects will become more apparent from the drawings and specification developed in more detail hereinafter.

In the drawings:

FIGURE 1 illustrates the technique employed in making the swivel described herein, and shows a mold, partly in cross section, with the swivel elements disposed in the mold cavity as inserts.

FIGURE 2 shows the complete swivel, partly in cross section.

FIGURE 3 illustrates a preferred technique of applying pressure to the main body of the swivel after molding to loosen the embedded rotatable elements.

FIGURE 4 illustrates an alternate mold design for making the swivel body.

FIGURE 5 illustrates an alternate design for the swivel elements.

More specific reference will now be made to the drawings for a detailed description of the invention. As indicated, the mold of FIGURE 1 is used in making the swivel shown in FIGURE 2. The mold is composed of two sections 10 and 11 having complementary recesses 12 and 13, whereby when the mold is closed, form a mold cavity 14. The letter P designates the parting line or juncture of the two mold sections. Also provided in each mold section are additional complementary recesses 15 and 16, which together form a passageway 17 connecting with the mold cavity for introducing a molding composition from a suitable source of supply.

As shown in FIGURE 2, the swivel contemplated by the present invention is composed basically of three parts, namely, a molded body 19 and two swivel elements 20 and 21 having their inner opposing ends embedded within the body 19. In general, it has been found preferable to form the swivel elements with a shank and an enlarged conical head or nose section 22 having a base diameter greater than the shank, whereby the base of the conical nose section extends beyond the shank forming a flange. Each of the elements is independently capable of three hundred and sixty degree rotation within the body.

In forming the swivel the elements are prepositioned within the mold cavity as illustrated in FIGURE 1. Preferably, the elements 20 and 21 are formed initially as a single integral body connected by a small frangible section 24, described in further detail hereinafter. Elements 20 and 21 may be formed in any suitable manner from an appropriate material. Generally, the elements will be formed of a metal or metal alloy such as brass, copper or stainless steel depending upon the ultimate use of the swivel. For purposes of connecting the elements to some additional member, holes A and B may be provided, as shown, in each shank.

When the elements 20 and 21 are properly inserted into the mold cavity 14, their shanks are disposed in retaining recesses 25 and 26, respectively, as illustrated in FIGURE 1. If elements 20 and 21 are formed initially as an integral body with a connecting section 24, one of the shanks will be inserted into one of the recesses 25 or 26 when the mold is in open position. When the mold is closed the shank of the opposite element will enter the opposite recess in the complementary mold section. It will be noted that excess space is provided in each recess 25 and 26 sufficient to permit backward movement of the shanks of each element within the recesses for the purpose set forth below.

In forming the swivel a suitable molding composition such as Teflon, nylon, or polyethylene is forced under pressure through passageway 17 from a suitable source of supply into cavity 14. The plastic material is normally introduced in a fluid or semi-fluid state, whereby it completely fills cavity 14. When elements 20 and 21 are formed as an integral unit, frangible section 24 connecting the two elements is so designed as to be broken under the pressure of the plastic introduced into the cavity 14. Upon fracturing section 24 the continued pressure of the plastic will force the elements in opposite directions, as indicated by arrows X, backward into recesses 25 and 26, thereby permitting the area between the nose cones of the elements to be completely filled with plastic. The resulting molded body of the swivel with the elements embedded is shown in FIGURE 2. The relative length of the shanks of the elements 20 and 21 and the depth of the recesses 25 and 26 will fix the position of the elements within the molded body 19. The flange of the nose cone 22 projecting beyond the shank of the elements serves to permanently hold the elements within the body 19 and prevents their withdrawal.

After the body is molded and the elements 20 and 21 are embedded therein, one additional operation is normally required to loosen the elements within the body 19 and thereafter permit their 360° swivel action. Thus, immediately after molding the elements 20 and 21 are usually held relatively tight within the body 19. It has been found that, if the body is subject to a rolling pressure, the elements are freed sufficiently within the body 19 so as to permit complete freedom of rotation of the elements without sticking or binding, particularly when the plastic is one of the well known materials having a low coefficient of friction, such as the aforementioned nylon, Teflon, etc. and the elements are metallic.

Preferably, the desired loosening or freeing of elements 20 and 21 within body 19 is accomplished by placing body 19 between two horizontal surfaces, such as surfaces 30 and 31 of FIGURE 3, and imparting a rolling movement to body 19 while simultaneously applying pressure on the body, such as is indicated by the arrows in FIGURE 3. This rolling and pressure operation apparently deforms the plastic body sufficiently to release it from any adherence to the elements, with the result that the elements thereafter have complete rotational freedom. Due to the flange of the nose section 22, however, the elements, as indicated previously, are permanently retained integral with the body.

The foregoing rolling and pressure operation to which the body 19 is subjected after molding may be applied in any one of several ways. However, for mass production, the molded body and elements may be ejected from the mold and introduced, properly oriented, into a suitable trough or conveyor apparatus which simultaneously imparts the desired rolling and pressure between two appropriately disposed surfaces.

FIGURE 4 illustrates a modification of the invention, whereby additional space may be provided between the plastic body of the swivel and the shanks of the respective elements. In FIGURE 4, the two mold sections are designated by the numerals 40 and 41. A passage 42 similar to passage 17 of FIGURE 1 is provided for introduction of a plastic molding composition under pressure into the mold cavity 43.

The modification of FIGURE 4 resides in the provision of a relatively thin cylindrical projection 44 which extends into the mold cavity for a predetermined distance. Generally, if used, cylindrical projection 44 will be only a few thousandths of an inch thick. Its primary purpose is to prevent the shank of element 46 from intimate contact with the molded body and thereby provide a small clearance between the body and the shank. The extension of projection 44 into the mold cavity will be determined by the amount which element 46 should be retracted into recess 45 upon rupture of the frangible section 47 under pressure of molding composition.

A further modification of the swivel is shown in FIGURE 5. In this modification the rotatable element 50 is provided with an enlarged cylindrical head section 51 in lieu of the conical head section previously described. This modified element may be embedded within the molded body in substantially the same manner as set forth above with respect to the elements provided with the conical head section.

While the foregoing description has been primarily concerned with a swivel composed of a molded body and two rotatable elements, it will be appreciated that for some specialized applications a molded body containing one such rotatable element may be formed in the same manner.

Having described the invention and certain embodiments thereof the same is only intended to be limited by the scope of the following claims.

I claim:
1. A method of forming a swivel composed of two longitudinally aligned rotatable elements permanently embedded in spaced relationship within a molded body whereby each element is capable of independent 360° rotation with respect to the body, which comprises disposing said elements while initially joined together in longitudinal alignment by a frangible connecting section in a mold cavity with the free ends of said connected elements being installed in longitudinally opposing recesses extending outwardly from the mold cavity, the distance between the closed ends of the opposing recesses being greater than the overall length of the elements when joined together, injecting into said mold cavity a fluidized molding composition having a low coefficient of friction under sufficient pressure to rupture said frangible connecting section and force said elements longitudinally apart and permitting said molding composition to solidify in the cavity forming a solid body whereby opposing portions of each element are permanently embedded in said body in longitudinal spaced relationship.

2. A method as described in claim 1 wherein said body and elements are subjected to relative movement after removal from the mold to release any adhesion created during molding between the body and that portion of each element embedded therein.

3. A method as described in claim 1 wherein the molding composition is nylon.

4. A method as described in claim 1 wherein the molding composition is polyethylene.

References Cited by the Examiner

UNITED STATES PATENTS

| | | | |
|---|---|---|---|
| 941,032 | 11/09 | McCarthy | 59—9 |
| 1,316,877 | 9/19 | Clarkson | 59—9 |
| 2,466,243 | 4/49 | Johnson | 59—95 |
| 2,574,800 | 11/51 | Skold | 59—95 |
| 2,768,415 | 10/56 | Morin | 264—242 |
| 2,954,992 | 10/60 | Baker | 264—242 |
| 3,094,376 | 6/63 | Thomas | 264—242 |
| 3,109,702 | 11/63 | Hosbein et al. | 264—278 |

FOREIGN PATENTS 623,911   12/35   Germany.

ROBERT F. WHITE, *Primary Examiner.*
WILLIAM STEPHENSON, *Examiner.*